US012783681B2

(12) United States Patent
Agrawal et al.

(10) Patent No.: US 12,783,681 B2
(45) Date of Patent: Nov. 3, 2026

(54) SOURCE DEVICE AUTONOMOUS SECURITY FROM SECURITY THREAT ON PEERED RECEIVING DEVICE DURING PEER-TO-PEER APPLICATION STREAMING

(71) Applicant: MOTOROLA MOBILITY LLC, Wilmington, DE (US)

(72) Inventors: Amit Kumar Agrawal, Bangalore (IN); Krishnan Raghavan, Bangalore (IN)

(73) Assignee: Motorola Mobility LLC, Chicago, IL (US)

(*) Notice: Subject to any disclaimer, the term of this patent is extended or adjusted under 35 U.S.C. 154(b) by 42 days.

(21) Appl. No.: 18/619,788

(22) Filed: Mar. 28, 2024

(65) Prior Publication Data

US 2025/0307416 A1 Oct. 2, 2025

(51) Int. Cl.
*G06F 21/57* (2013.01)
*G06F 21/60* (2013.01)

(52) U.S. Cl.
CPC .......... *G06F 21/577* (2013.01); *G06F 21/604* (2013.01)

(58) Field of Classification Search
None
See application file for complete search history.

(56) References Cited

U.S. PATENT DOCUMENTS 8,095,964 B1 * 1/2012 Zhong ................. H04L 63/1416 726/4
9,535,733 B2 * 1/2017 Rui ....................... H04L 65/612
10,893,058 B1 * 1/2021 Casaburi ............... G06F 21/566
11,514,171 B2 * 11/2022 Dinh ....................... G06N 5/022
2008/0189788 A1 * 8/2008 Bahl ................... H04L 63/1416 726/25
2014/0289639 A1 * 9/2014 Halim ................... H04L 67/025 715/740
2017/0180395 A1 * 6/2017 Stransky-Heilkron ...................... H04W 12/128
2017/0201491 A1 * 7/2017 Schmidt .................. H04L 63/08
2017/0201588 A1 * 7/2017 Schmidt ................ H04L 63/105
2018/0336373 A1 * 11/2018 Deenadayal ............ G06F 21/10
2018/0359237 A1 * 12/2018 Shem Tov ............ G06F 21/577
2020/0084225 A1 * 3/2020 McKendall ............. G06F 21/54
2021/0092136 A1 * 3/2021 Woodworth ........ H04L 63/1416
2021/0157917 A1 * 5/2021 Hebert .................. G06F 21/554
(Continued)

*Primary Examiner* — Michael Pyzocha
(74) *Attorney, Agent, or Firm* — Isidore PLLC

(57) ABSTRACT

An electronic device, computer program product, and method provide autonomous protection from security threat on peered receiving device(s) during peer-to-peer application streaming. A device processor of the electronic device: establishes a streaming session over a connection established with a secondary electronic device via a communication interface; receives first security threat information from the second electronic device; analyzes the first security threat information to determine whether the secondary electronic device is vulnerable to any security threats; and in response to the first security threat information indicating that the secondary electronic device is vulnerable to at least one security threat: (i) generates and output an alert indicating a vulnerability of the secondary electronic device to the at least one security threat; and (ii) applies one or more types of restriction to the streaming session to restrict access to one or more portions of the information at the secondary electronic device.

20 Claims, 7 Drawing Sheets

(56) References Cited

U.S. PATENT DOCUMENTS

| | | | | |
|---|---|---|---|---|
| 2021/0218766 | A1* | 7/2021 | Soman | G06F 21/554 |
| 2021/0243233 | A1* | 8/2021 | Singh | H04L 63/0435 |
| 2022/0224987 | A1* | 7/2022 | Nazirudeen | H04N 21/4367 |
| 2022/0309197 | A1* | 9/2022 | Dattani | G06Q 20/405 |
| 2023/0044156 | A1* | 2/2023 | Mehta | G06Q 10/0635 |
| 2023/0230085 | A1* | 7/2023 | Turgeman | G06Q 20/40145 |
| 2023/0291669 | A1* | 9/2023 | Kuvikov | G06F 11/0793 |
| 2023/0291755 | A1* | 9/2023 | Siebel | G06N 3/006 |
| 2023/0362651 | A1* | 11/2023 | Lie | H04W 12/30 |
| 2023/0370434 | A1* | 11/2023 | Nadir | H04L 63/20 |
| 2024/0048568 | A1* | 2/2024 | Mouallem | H04L 63/1425 |
| 2024/0211283 | A1* | 6/2024 | Panchmahalkar | G06F 9/45533 |
| 2024/0333723 | A1* | 10/2024 | Morgan | H04L 63/102 |
| 2024/0422156 | A1* | 12/2024 | Meisner | H04L 63/102 |
| 2025/0023853 | A1* | 1/2025 | Nambannor Kunnath | G06F 9/45558 |
| 2025/0045419 | A1* | 2/2025 | Bhagwat | G06F 9/452 |

* cited by examiner

500

| | TYPE OF APPLICATION 505 | RISK INFORMATION 515 | TYPE OF MALWARE 525 | PREVENTIVE ACTION 535 |
|---|---|---|---|---|
| 501 | BANKING APPLICATION 506 | FINANCIAL / CONFIDENTIAL INFORMATION 516 | INPUT/KEYBOARD MALWARE 526A | DISCONTINUATION/ SELECTIVE FIELD MASKING 536 |
| 502 | VIDEO APP - CONFIDENTIAL CONTENT 508 | CONFIDENTIAL INFORMATION 518 | SCREEN CAPTURE/ RECORDING MALWARE 528A | SCREEN SHOT/ RECORDING BLOCKAGE 538A |
| 503 | PHOTO APP – SENSITIVE/ PRIV. CONTENT 510 | SENSITIVE / PRIVATE INFORMATION 520 | SCREEN CAPTURE/ RECORDING MALWARE 528B | SCREENSHOT/ RECORDING BLOCKAGE 538B |
| 504 | DOCUMENT APP – CONFIDENTIAL CONTENT 512 | CONFIDENTIAL INFORMATION 522 | SCREEN CAPTURE/ RECORDING MALWARE 528C | SCREENSHOT/ RECORDING BLOCKAGE 538C |

FIG. 5

SOURCE DEVICE AUTONOMOUS SECURITY FROM SECURITY THREAT ON PEERED RECEIVING DEVICE DURING PEER-TO-PEER APPLICATION STREAMING

BACKGROUND

1. Technical Field

The present disclosure relates generally to security of electronic devices and in particular to security of electronic devices during streaming/sharing of content from other electronic devices.

2. Description of the Related Art

Content/Application streaming from one electronic device to another electronic device has become a known way to share device features/functions from a source to a destination device. For example, a first electronic device (or a primary electronic device) can execute sharing of an application, and the information (e.g., video or graphical user interface) generated by the application can be streamed to a second electronic device (or secondary electronic device). A user of the second electronic device can use the information to interact with the application as if the application is executing in the second electronic device.

Malwares existing on an electronic device can present security risks to information, including confidential or sensitive information, stored within or entered at the particular device. To protect the first electronic device from being infected by malwares, anti-malware applications can be installed in the first electronic device. The anti-malware applications executing in the first electronic device, however, can only protect the first electronic device and not the second electronic device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 5 depicts a table with examples of different types or levels of restrictions that can be applied to the information streamed to the secondary electronic device based on the security threat information reported by the secondary electronic device, according to one or more embodiments.

DETAILED DESCRIPTION

Figure 1:
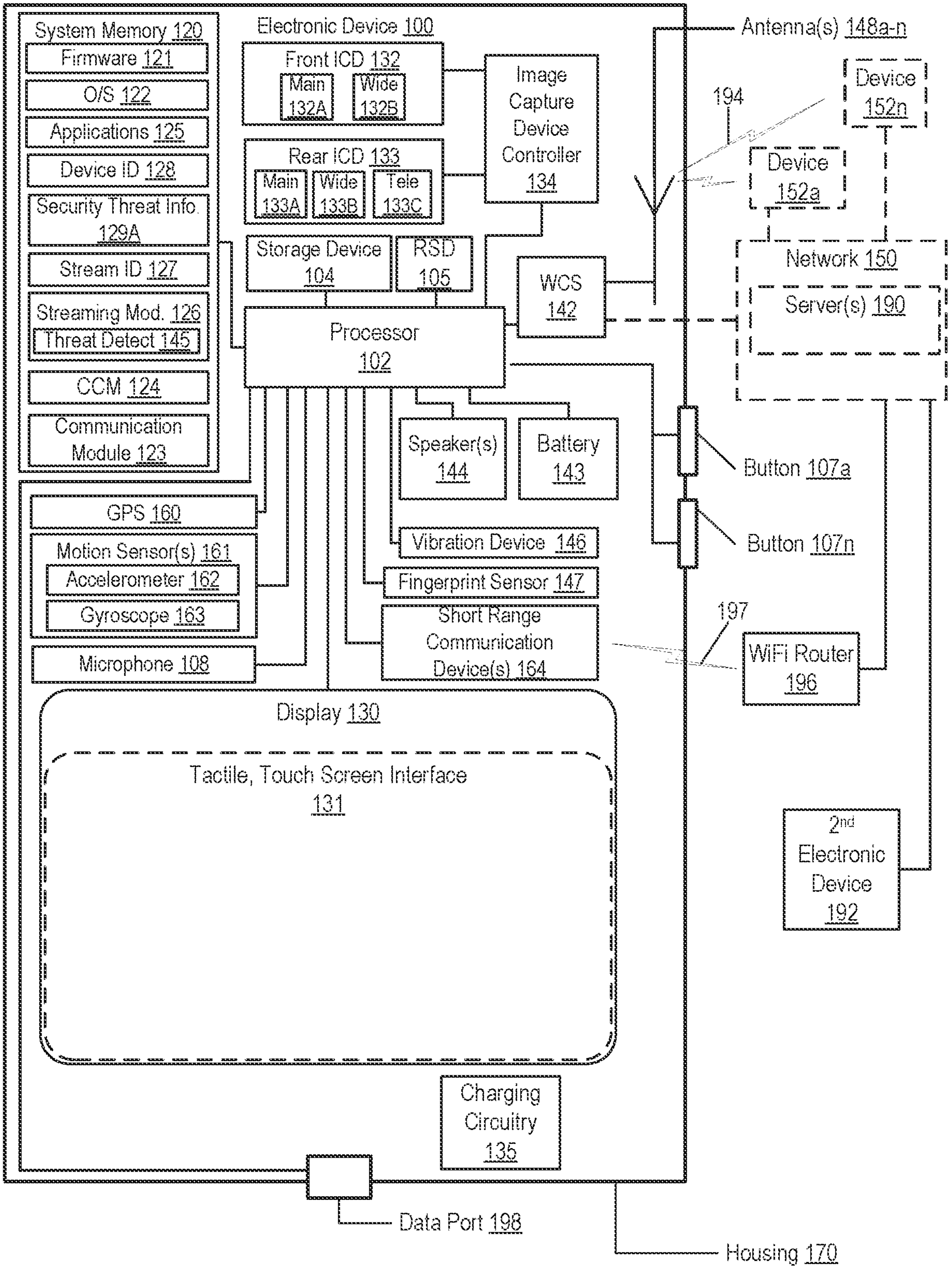
FIG. 1A depicts an example primary electronic device within which various aspects of the disclosure can be implemented to protect information during application/content streaming to a second electronic device, according to one or more embodiments.

The present disclosure provides an electronic device, a method, and a computer program product that enables autonomous protection from security threats detected on a peered receiving device during peer-to-peer application streaming. According to one or more embodiments, the electronic device includes a communication interface that connects the electronic device to a second electronic device to enable streaming of information from the electronic device to the second electronic device. The electronic device also includes a memory that includes a security-enabled streaming module to configure the electronic device to stream the information using a connection established between the electronic device and the second electronic device. The security-enabled streaming module includes an associated security threat detection module for configuring the device to enable identification of potential threats existing on the second electronic device. The electronic device also includes at least one processor communicatively coupled to the communication subsystem, and the memory.

The at least one processor executes program code of the security-enabled streaming module and configures the electronic device to: (i) establish a streaming session over the connection established, via the communication interface, with the second electronic device; (ii) receive first security threat information from the second electronic device prior to and/or during the streaming session; (iii) analyze the first security threat information to determine whether the second electronic device is vulnerable to any security threats; and (iv) in response to the first security threat information indicating that the second electronic device is vulnerable to at least one security threat, generate and output an alert indicating a vulnerability of the second electronic device to the at least one security threat, and apply one or more types of restriction to the streaming session to restrict access to the one or more portions of the information at the second electronic device.

According to one or more embodiments, the method provides computer-implemented processes for enabling autonomous protection from security threats on peered receiving device during peer-to-peer application streaming. The method includes establishing, from a first electronic device, a streaming session over a connection established with a second electronic device via a communication interface. The method also includes: receiving first security threat information from the second electronic device during the streaming session; analyzing the first security threat information to determine whether the second electronic device is vulnerable to any security threats; and, in response to the first security threat information indicating that the second electronic device is vulnerable to at least one security threat, generating and outputting an alert indicating a vulnerability of the second electronic device to the at least one security threat, and applying one or more types of restriction to the streaming session to restrict access to one or more portions of the information at the second electronic device.

According to one or more embodiments, the disclosure may include a computer program product that includes a computer readable storage device and program code on the computer readable storage device that when executed by a processor associated with an electronic device, the program code causes the processor to configure the communication device to provide functionality of the above-described and additional method processes.

The present disclosure addresses issues that arise when confidential or sensitive information is streamed from the first electronic device to the second electronic device, where the information can be compromised because the second electronic device is vulnerable to one or more security threats. Often the information is not compromised when the information is stored in a storage media of the first electronic device, particularly when the first electronic device is protected by executing anti-malware applications. However, the anti-malware applications executing in the first electronic device is ineffective to protect the information after the information is presented or streamed to the second electronic device. This can result in the information being compromised at the second electronic device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As provided herein, the term "information" is not limited to only information generated by an application executing in the first electronic device and streamed to the second electronic device, but can encompass information that is stored in the first electronic device and shared with the second electronic device by streaming as well as information that is provided by an external source, retrieved by the first electronic device, and then streamed by the first electronic device to the second electronic device, or a combination thereof. Further, the information streamed to the second electronic device can be in different forms and can include a combination of one or more of text information, image information, audio information and video information.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts an example electronic device 100 within which various aspects of the disclosure can be implemented, according to one or more embodiments. Examples of such electronic devices include, but are not limited to, mobile devices, a notebook computer, a mobile phone, a digital camera, a smart watch, a tablet computer, and a communication device, etc. Electronic device 100 (also referred to as a primary electronic device) includes processor 102, which is communicatively coupled to storage device 104, system memory 120, input devices, introduced below, output devices, such as display 130, and image capture device (ICD) controller 134. Processor 102 can include processor resources such as a central processing unit (CPU) that support computing, classifying, processing, and transmitting of data and information. Electronic device 100 includes a plurality of image capturing devices, presented as front and rear facing cameras 132, 133. The ICD controller 134 may perform or support functions such as, but not limited to, selecting and activating an active camera from among multiple cameras. Throughout the disclosure, the term image capturing device is utilized interchangeably to be synonymous with and/or refer to any one of front or rear facing cameras 132, 133.

System memory 120 may be a combination of volatile and non-volatile memory, such as random-access memory (RAM) and read-only memory (ROM). System memory 120 can store program code or similar data associated with firmware 121, an operating system 122, communication module 123, camera control module (CCM) 124, applications 125, streaming module 126, and threat detection module 145. Communication module 123 includes program code that is executed by processor 102 to enable electronic device 100 to communicate with other external devices and systems.

The streaming module 126 (also referred to as security-enabled streaming module) can be implemented to stream information to a second electronic device (also referred to as a secondary electronic device). In one or more embodiments, the streaming module 126 can be implemented to include threat detection module 145. The threat detection module 145 can process security threat information received from a secondary electronic device and identify security threats that can capture or intercept the information streamed to the secondary electronic device and/or information entered at the secondary electronic device during the streaming session. The security threats identified by the threat detection module 145 can be stored as security threats 129A. In implementation, the security threats 129A are labeled or tagged to be associated with a specific second electronic device, where the primary device can stream to multiple second devices.

In one or more embodiments, the threat detection module 145 can be implemented using artificial intelligence (AI) and can include program code that can be trained to perform operations related to identifying security threats of a secondary electronic device and preventing the information streamed to the second electronic device from being exposed to the identified security threats. In one or more embodiments, the operations performed using AI can include restricting access to the information streamed to the secondary electronic device. Restricting access can include blocking or masking one or more portions of the information from being visible. In one or more embodiments, the threat detection module 145 can be implemented separately from the streaming module 126.

Although depicted as being separate from applications 125, the CCM 124, the streaming module 126, the threat detection module 145, and communication module 123 may each be implemented as an application. Processor 102 loads and executes program code stored in system memory 120. Examples of program code that may be loaded and executed by processor 102 include program code associated with communication module 123 and applications 125 and program code associated with streaming module 126, threat detection module 145, and communication module 123. Execution of the code associated with the streaming module 126 causes the processor 102 to identify a secondary electronic device using the device identification 128 and identify a stream (e.g., from multiple streams) using the stream identification 127 to stream information to the secondary electronic device. The information streamed to the secondary electronic device can include one or more of information generated by an application executing in the electronic device 100 and information stored in a storage area (e.g., storage device 104) associated with the electronic device 100. Execution of the code associated with the streaming module 126 can also cause the processor 102 to communicate with the secondary electronic device to receive security threat information from the secondary electronic device. Execution of the code associated with the streaming module 126 can include execution of the code associated with the threat detection module 145 to cause the processor 102 to identify the security threats from the security threat information and to restrict access to one or more portions of the streamed information according to the identified security threats.

According to one or more embodiments, electronic device 100 includes removable storage device (RSD) 105, which is inserted into an RSD interface (not shown) that is communicatively coupled via system interlink to processor 102. According to one or more embodiments, RSD 105 is a computer readable storage device encoded with program code and corresponding data, and RSD 105 can be interchangeably referred to as a non-transitory computer program product or non-transitory computer readable storage device having non-transitory computer readable program code/instructions. RSD 105 may have a version of streaming module 126 stored thereon, in addition to other program code. Processor 102 can access RSD 105 to provision electronic device 100 with program code that, when executed by processor 102, the program code causes or configures electronic device 100 to provide the functionality described herein.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or to control electronic device 100 by touching features presented within/below the display screen. Tactile, touch screen interface 131 can be utilized as an input device.

Front facing cameras (or image capture device (ICD)) 132 are communicatively coupled to ICD controller 134, which is communicatively coupled to processor 102. ICD controller 134 supports the processing of signals from front facing cameras 132. Front facing cameras 132 can capture images that are within the field of view (FOV) of image capture device 132. Electronic device 100 includes several front facing cameras 132. First front facing camera 132A is a main camera that captures a standard angle FOV. Second front facing camera 132B is wide angle camera that captures a wide angle FOV. Front facing cameras 132A and 132B can be collectively referred to as front facing cameras 132A-132B or front facing camera(s) 132. While two front facing cameras 132A-132B are shown, electronic device 100 can have more or less than two front facing cameras.

Electronic device 100 further includes several rear facing cameras 133. First rear facing camera 133A is a main camera that captures a standard angle FOV. Second rear facing camera 133B is wide angle camera that captures a wide angle FOV. Third rear facing camera 133C is a telephoto ICD that captures a telephoto FOV (zoom or magnified). Each rear facing camera 133A, 133B, and 133C is communicatively coupled to ICD controller 134, which is communicatively coupled to processor 102. ICD controller 134 supports the processing of signals from rear facing cameras 133A, 133B and 133C. Rear facing cameras 133A, 133B and 133C can be collectively referred to as rear facing cameras 133A-133C or rear facing cameras 133. While three rear facing cameras are shown, electronic device 100 can have less than three rear facing cameras, such as having only one or two rear facing cameras, or can have more than three rear facing cameras.

Electronic device 100 can further include data port 198, charging circuitry 135, and battery 143. Electronic device 100 further includes microphone 108, one or more output devices such as speakers 144, and one or more input buttons 107*a*-107*n*. Input buttons 107*a*-107*n* may provide controls for volume, power, and image capture device 132. Microphone 108 can also be referred to as audio input device 108. Microphone 108 and input buttons 107*a-n* can also be referred to generally as input devices.

Electronic device 100 further includes wireless communication subsystem (WCS) 142, which is coupled to antennas 148*a*-148*n*. According to one or more embodiments, WCS 142 can include a communication module with one or more baseband processors or digital signal processors, one or more modems, and a radio frequency (RF) front end having one or more transmitters and one or more receivers. Wireless communication subsystem (WCS) 142 and antennas 148*a*-148*n* allow electronic device 100 to communicate wirelessly with wireless network 150 via transmissions of communication signals 194 to and from network communication devices 152*a*-152*n*, such as base stations or cellular nodes, of wireless network 150. In one embodiment, network communication devices 152*a*-152*n* contain electronic communication equipment to allow communication with electronic device 100.

Wireless network 150 further allows electronic device 100 to wirelessly communicate with second electronic devices 192, which can be similarly connected to wireless network 150 via one of network communication devices 152*a-n*. Wireless network 150 is communicatively coupled to wireless fidelity (WiFi) router 196. Electronic device 100 can also communicate wirelessly with wireless network 150 via communication signals 197 transmitted by short range communication device(s) 164 to and from WiFi router 196, which is communicatively connected to wireless network 150. According to one or more embodiments, wireless network 150 can include one or more servers 190 that support exchange of wireless data and video and other communication between electronic device 100 and second electronic device 192.

Electronic device 100 further includes short range communication device(s) 164. Short range communication device 164 is a low powered transceiver that can wirelessly communicate with other devices. Short range communication device 164 can include one or more of a variety of devices, such as a near field communication (NFC) device, a Bluetooth device, and/or a wireless fidelity (Wi-Fi) device. Short range communication device 164 can wirelessly communicate with WiFi router 196 via communication signals 197. In one embodiment, electronic device 100 can receive internet or Wi-Fi based calls via short range communication device 164. In one embodiment, electronic device 100 can communicate with WiFi router 196 wirelessly via short range communication device 164. In an embodiment, WCS 142, antennas 148*a-n* and short-range communication device(s) 164 collectively provide communication interface(s) of electronic device 100. These communication interfaces enable electronic device 100 to communicatively connect to at least one second electronic device 192 via at least one network. In one or more embodiments, the streaming of the information performed by the streaming module 126 can be supported/established by a peer-to-peer connection using one of these short-range communication devices 164.

Electronic device 100 further includes vibration device 146, fingerprint sensor 147, global positioning system (GPS) device 160, and motion sensor(s) 161. Vibration device 146 can cause electronic device 100 to vibrate or shake when activated. Vibration device 146 can be activated during an in-coming call or message in order to provide an alert or notification to a user of electronic device 100. According to one aspect of the disclosure, display 130, speakers 144, and vibration device 146 can generally and collectively be referred to as output devices. Fingerprint sensor 147 can be used to provide biometric data to identify or authenticate a user. GPS device 160 can provide time data and location data about the physical location of electronic device 100 using geospatial input received from GPS satellites.

Motion sensor(s) 161 can include one or more accelerometers 162 and gyroscope 163. Motion sensor(s) 161 can detect movement of electronic device 100 and provide motion data to processor 102 indicating the spatial orientation and movement of electronic device 100. Accelerometers 162 measure linear acceleration of movement of electronic device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of electronic device 100. According to one or more embodiments, the measurements of these various sensors can also be utilized by processor 102 in the determining of the context of a communication. Electronic device 100 further includes housing 170 that contains/protects the components of electronic device 100.

Figure 2:
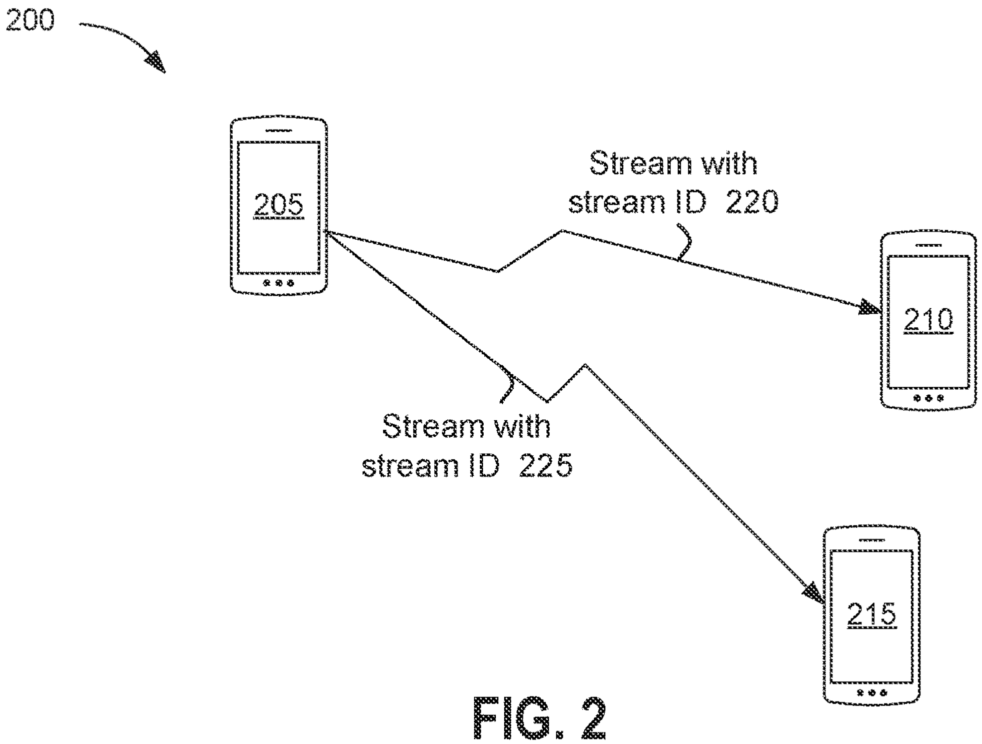
FIG. 2 depicts an example connection scenario within which a primary electronic device can stream information to two connected secondary electronic devices, according to one or more embodiments.

FIG. 2 depicts an example connection scenario 200 within which a primary electronic device 205 can stream information to two connected secondary electronic devices 210 and 215, according to one or more embodiments. The primary electronic device 205 can be similarly configured as electronic device 100 of FIG. 1. Each of the secondary electronic devices 210 and 215 can be individually peered with and receive information streamed from/by the primary electronic device 205. Depending on the security threats that each of the secondary electronic devices 210 and 215 is exposed to, the information that each of the secondary electronic devices 210 and 215 received from the primary electronic device 205 can be presented with minimal or no modification or with varying restrictions.

In one example, primary electronic device 205 can be configured to stream the same or similar information to each of the secondary electronic devices 210 and 215. For example, the information streamed to both of the secondary electronic devices 210 and 215 can be generated by the same application executing in the primary electronic device 205. Thus, in the situation when each of the secondary electronic devices 210 and 215 is exposed to different security threats, the information presented on a display of the secondary electronic device 210 can be different from the information presented on a display of the secondary electronic device 215. It is noted that the streaming to the secondary electronic devices 210 and 215 can occur at the same time or at different times.

In one or more embodiments, the information streamed to the secondary electronic device 210 can be generated by one application executing in the primary electronic device 205, while the information streamed to the secondary electronic device 215 can be generated by another application executing in the primary electronic device 205. Each stream can be associated with a different stream ID (e.g., stream ID 220 or stream ID 225). These two streams of information are also subjected to the security threats associated with each of the secondary electronic devices 210 and 215.

In one or more embodiments, to distinguish the possible secondary electronic devices that the primary electronic device 205 can communicate with, each of the secondary electronic devices 210 and 215 can be associated with an identification that is stored as device identification 128 (see FIG. 1). Similarly, to distinguish the different streams that the primary electronic device 205 can stream to the secondary electronic devices 210 and 215, each stream from the primary electronic device 205 can be associated with an identification stored as stream identification 127. Each of the secondary electronic devices 210 and 215 can be exposed to zero or more security threats. In one or more embodiments, the security threats that each of the secondary electronic devices 210 and 215 is exposed to can be communicated to the primary electronic device 205 and stored as security threats 129A.

It is noted that, in one or more embodiments, the primary electronic device 205 can stream information to one secondary electronic device 210. However, in some alternative embodiments, the primary electronic device 205 can stream the same stream of information to both of the secondary electronic devices 210 and 215.

Figure 3:
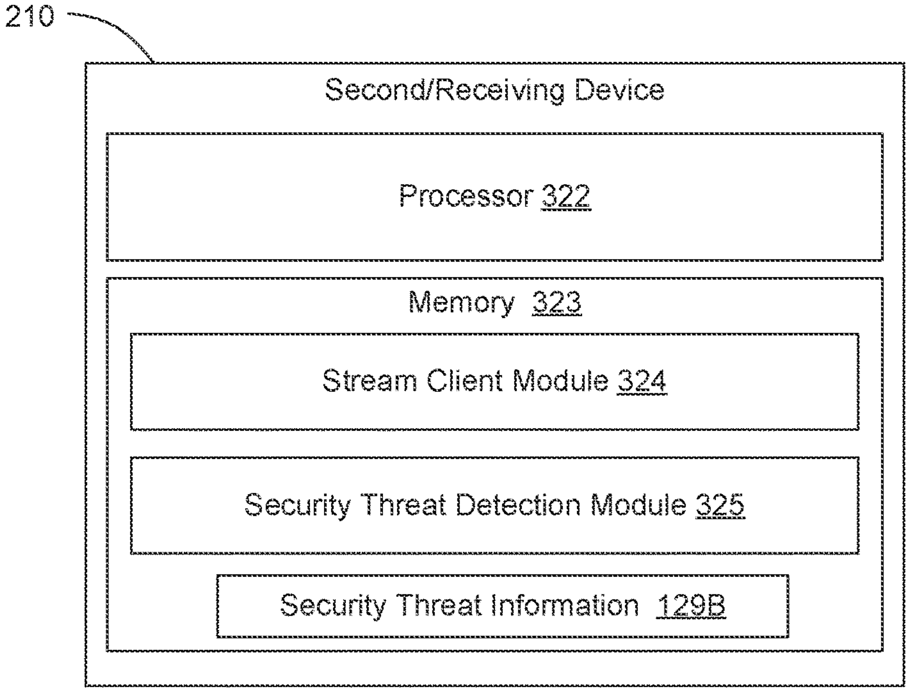
FIG. 3 depicts an example secondary electronic device that can be implemented to communicate security threat information to the primary electronic device and to receive information streamed by the primary electronic device, according to one or more embodiments.

FIG. 3 depicts an example secondary electronic device 210 that can be configured to receive information streamed by the primary electronic device 205 and to communicate security threat information to the primary electronic device 205, according to one or more embodiments. The secondary electronic device 210 can be implemented similarly to electronic device 100 of FIG. 1 including, for example, the processor 322 and the memory 323. In one or more embodiments, the secondary electronic device 210 can be implemented to include stream client module 324 to receive information streamed by the primary electronic device 205. The stream client module 324 can be implemented to operate in conjunction with the streaming module 126 of the primary electronic device 205 to receive the streamed information. In one or more embodiments, the stream client module 324 can be configured to present the streamed information on a display of the secondary electronic device 210.

The secondary electronic device 210 can be configured to include security threat detection module 325 to determine whether the secondary electronic device 210 is vulnerable to any security threats. For example, the security threat detection module 325 can include malware detection codes to scan the secondary electronic device 210 to identify any hidden malwares. Some examples of malwares include viruses, worms, trojan horses, ransomware, and spyware. Scanning the secondary electronic device 210 can include scanning the memory 323 and any storage devices associated with the secondary electronic device 210. The security threat detection module 325 can cause the processor 322 of secondary electronic device 210 to store information about the detected malwares in security threat information 129B. In one or more embodiments, the names of the specific malwares can be stored in the security threat information 129B. For example, Zeus is a malware used by hackers to steal victims' sensitive financial and banking credentials by recording every keystroke made on a keyboard using keylogging. As another example, Screenshotter is a malware that surveils the victims' computer activities before stealing login credentials and other sensitive data using screen capturing. The names of the specific malware can then be used by the primary electronic device 205 to determine whether the information streamed to the secondary electronic device 210 is at risk of being captured or intercepted by hackers. It is noted that there can be many different types of security threats, and each type of security threat can attack an electronic device differently. The term "malware" is used to refer to a type of security threat that is associated with codes that get introduced into an electronic device with or without the consent or knowledge of a user of the electronic device.

In one or more embodiments, the secondary electronic device 210 can include similar software components to electronic device 100, including, for example, the streaming module 126 and the threat detection module 145, to enable the secondary electronic device 210 to stream information to another device (e.g., the secondary electronic device 215). In these situations, the secondary electronic device 210 can operate as a secondary electronic device to the primary electronic device 205 and as a primary electronic device to the secondary electronic device 215.

Figure 4A:
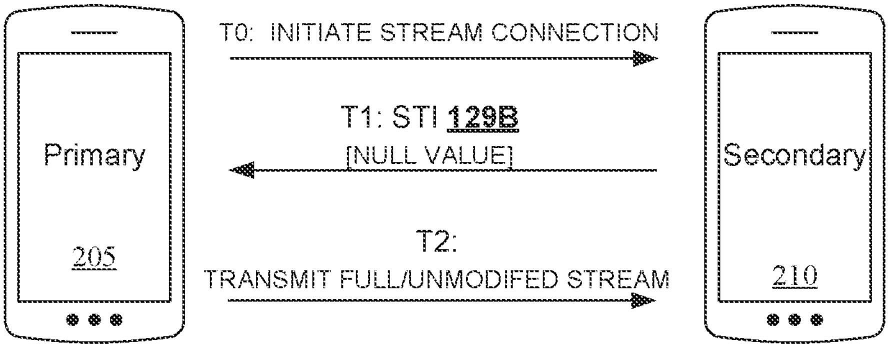
FIGS. 4A, 4B, and 4C depict different example scenarios within which the secondary electronic device communicates the security threat information to the primary electronic device, according to one or more embodiments.
Figure 4B:
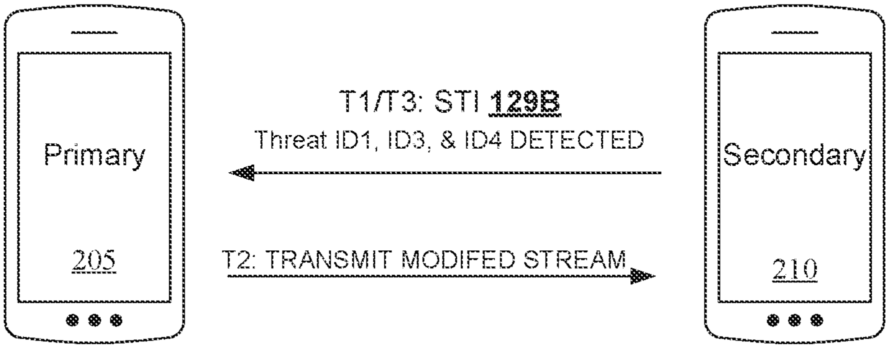
Figure 4C:
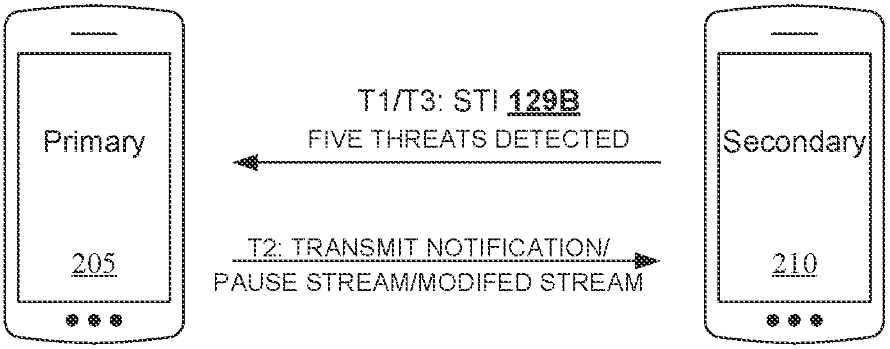

FIGS. 4A to 4C depict different example scenarios within which the secondary electronic device 210 communicates the security threat information 129B to the primary electronic device 205, following initiation of the peer-to-peer connection for application streaming, according to one or more embodiments. Three different time events are indicated by the communication arrows, represented as times T0, T1, and T2. T0 corresponds to the initiation of the peer-to-peer connection between primary and secondary devices to initiate or activate a streaming connection. During the activation, the primary device can, in one embodiment, transmit a request or trigger for the secondary device to provide an indication or report of security threat information existing at secondary device. Alternatively, in one embodiment, the secondary device can be configured by local processor execution of stream client module 324 to perform a self-security risk assessment of secondary electronic device. Right directional arrows indicate communication from primary device to secondary device. The labelled left directional arrow in each of the FIGS. 4A to 4C indicates a specific security threat information 129B identified via the respective labels, that is communicated from the secondary electronic device 210 to the primary electronic device 205. Referring to FIG. 4A, at the beginning of a streaming session, i.e., from time T0, the secondary electronic device 210 can be free of malwares, as indicated at time T1, where a null value is provided for the security threat information (STI) 129B returned by secondary electronic device 205. In one embodiment, no actual STI 129B is transmitted when the value is null (i.e., there are no security threats detected). Accordingly, at time T2, the information communicated from the primary electronic device 205 to the secondary electronic device 210 can be streamed without any restrictions.

In one embodiment, an unrestricted streaming session can be initiated between the primary electronic device 205 and the secondary electronic device 210, at which no security threats are initially detected. During the streaming session between the primary electronic device 205 and the secondary electronic device 210, the secondary electronic device 210 can be vulnerable to new malwares resulting from activities that the secondary electronic device 210 is involved in. For example, a user of the secondary electronic device 210 can cause an installation or an execution of an application by clicking on a link included in an email and unknowingly introduces new malwares (e.g., three malwares) to the secondary electronic device 210, as depicted in FIG. 4B. The types and IDs of these malwares are detected by security threat detection module 325, which continues to actively operate (i.e., periodically scanning the secondary device for malwares) in the background during the streaming session. At time T1/T3, following detection of these new malwares, secondary device communicates the STI 129B to primary device with the identification of the detected malware. The primary electronic device 205 is thus made aware of the specific type of security threat that exists and can modify the information being stream, at time T2/T4, to counter or prevent the specific threat to the information being shared or received via the streaming session. The dual times, T1/T3 and T2/T4, shown in FIG. 4B is intended to show the response by primary device 205 to the STI 129B received both at the initiation of the streaming session (time T0) and following time T2, at some time after the streaming session is activated and full access to the information has been provided, as described above.

FIG. 4C similarly illustrates secondary device communicating STI 129B at time T1/T3, where STI 129B indicates there are five security threats detected. Given the large number of security threats (e.g., greater than a threshold number 3), the primary electronic device 205 can respond by sending a notification, at time T2/T4, for presentation on the secondary electronic device 210 indicating that the secondary electronic device 210 is affected and requires to be cleaned/scanned before a streaming session can be performed or be allowed to continue. If the streaming session was ongoing at the time of the receipt of the new STI 129, the primary electronic device 205 can pause the streaming session or modify the streaming session to not present much of the required information for the stream to be useful or effective. This modified stream can also alert the user of the secondary electronic device 210 of the problem existing on the secondary electronic device 210.

In one or more embodiments, the security threat detection module 325 of the secondary electronic device 210 can periodically communicate the security threat information 129B to the primary electronic device 205. Alternatively, or in combination, the security threat detection module 325 can communicate the security threat information 129B to the primary electronic device 205 based on receiving a request (or periodically receiving a request) from the primary electronic device 205. Further, alternatively, or in combination, the security threat detection module 325 can communicate the security threat information 129B to the primary electronic device 205 whenever (i.e., in response to) the security threat detection module 325 determines that there is a change to the security threat information 129B.

In one or more embodiments, anti-malware applications can be installed in the secondary electronic device 210. The anti-malware applications can identify and remove or quarantine the detected malwares, thus reducing the number of malwares in the secondary electronic device 210 (e.g., from five malwares, as shown in in FIG. 4C, to three or less malwares, as depicted in FIG. 4B. In ideal situations, any malware that is installed and/or executing in the secondary electronic device 210 can be immediately identified and removed or quarantined to enable the secondary electronic device 210 to be malware-free so that the information streamed from the primary electronic device 205 can be without any restrictions. However, in most situations, there is usually a time lapse between when the malware application is installed and/or executing and when the malware application is detected. This can occur, for example, when the anti-malware application is scheduled to execute at a certain time of the day. Thus, there can be situations when the information streamed to the secondary electronic device 210 can be restricted due to the detected malwares reported in the security threat information 129B, even though the same malwares could be detected and quarantined by the installed anti-malware applications.

FIG. 5 depicts a table 500 with examples of different types or levels of restrictions that can be applied to the information streamed to the secondary electronic device 210 based on the security threat information 129B reported by the secondary electronic device 210, according to one or more embodiments. The determination of restrictions that can be applied to the information streamed to the secondary electronic device 210 can be based on multiple factors. The multiple factors are shown as column headings of the table 500 and include, for example, "type of application" 505, "risk information" 515, and "type of malwares" 525. The restrictions are specified under "preventive actions" 535 and can include actions that restrict how the streamed information is presented to a user of the secondary electronic device 210 and how certain features of the secondary electronic device 210 can be disabled. Although not specified in table 500, other factors can also be considered. Similarly, although not specified in table 500, different types of malwares can attack the information differently requiring different type of preventive actions to be performed to protect the information.

As examples, in row 501, the application is a banking application 506, and the information it generates includes financial information 516, which is considered to be confidential information. When the malwares identified in the security threat information 129A includes input/keyboard malware 526A, then the possible preventive action in this example scenario can include discontinuing the streaming of the information or masking fields (e.g., account number field, password field, etc.) in the streamed information that have the confidential information 536. In row 502, the application is a video application 508 that includes confidential information 518 (e.g, a video of a meeting that discusses confidential information), and the malwares identified in the security threat information 129*a* includes screen capture/recording malware 528A. The possible preventive action in this example scenario can include blocking any operations that are related to screen shot and/or screen recording 538A. In row 503, the application is a photo application 510 that includes personal/sensitive information 520 (e.g., family photos), and the malwares identified in the security threat information 129*a* includes screen capture/recording malware 528B. The possible preventive action in this example scenario can include blocking any operations that are related to screen shot and/or screen recording 538B. In row 504, the application is a document application 510 that includes confidential information 522 (e.g., tax returns), and the malwares identified in the security threat information 129*a* includes screen capture/recording malware 528C. The possible preventive action in this example scenario can include blocking any operations that are related to screen shot and/or screen recording 538C.

It can be noted that, when the information streamed to the secondary electronic device 210 does not include any confidential/private/sensitive information, there is minimal risk of exposing any confidential/private/sensitive information to any malwares. In those situations, any detected malwares included in the security threat information 129A (FIG. 1) is considered to be irrelevant to the information being streamed to the secondary electronic device 210. However, in situations when the information being streamed includes confidential/private/sensitive information (as depicted in the example scenarios of FIG. 5), and the detected malwares from the security threat information 129A are determined to be relevant to the confidential/private/sensitive information, then the streamed information can be restricted.

In one or more embodiments, the AI code of the threat detection module 145 (FIG. 1) includes program code that can be trained to determine the type of application (e.g., banking application 506) for an application executing in the primary electronic device 205, the type of information (e.g., confidential information 516) generated by the application, the detected malwares (e.g., input/keyboard malware 526A), and the restrictions (e.g., discontinuation or selective field masking 536) to be placed in the streamed information.

Figure 6:
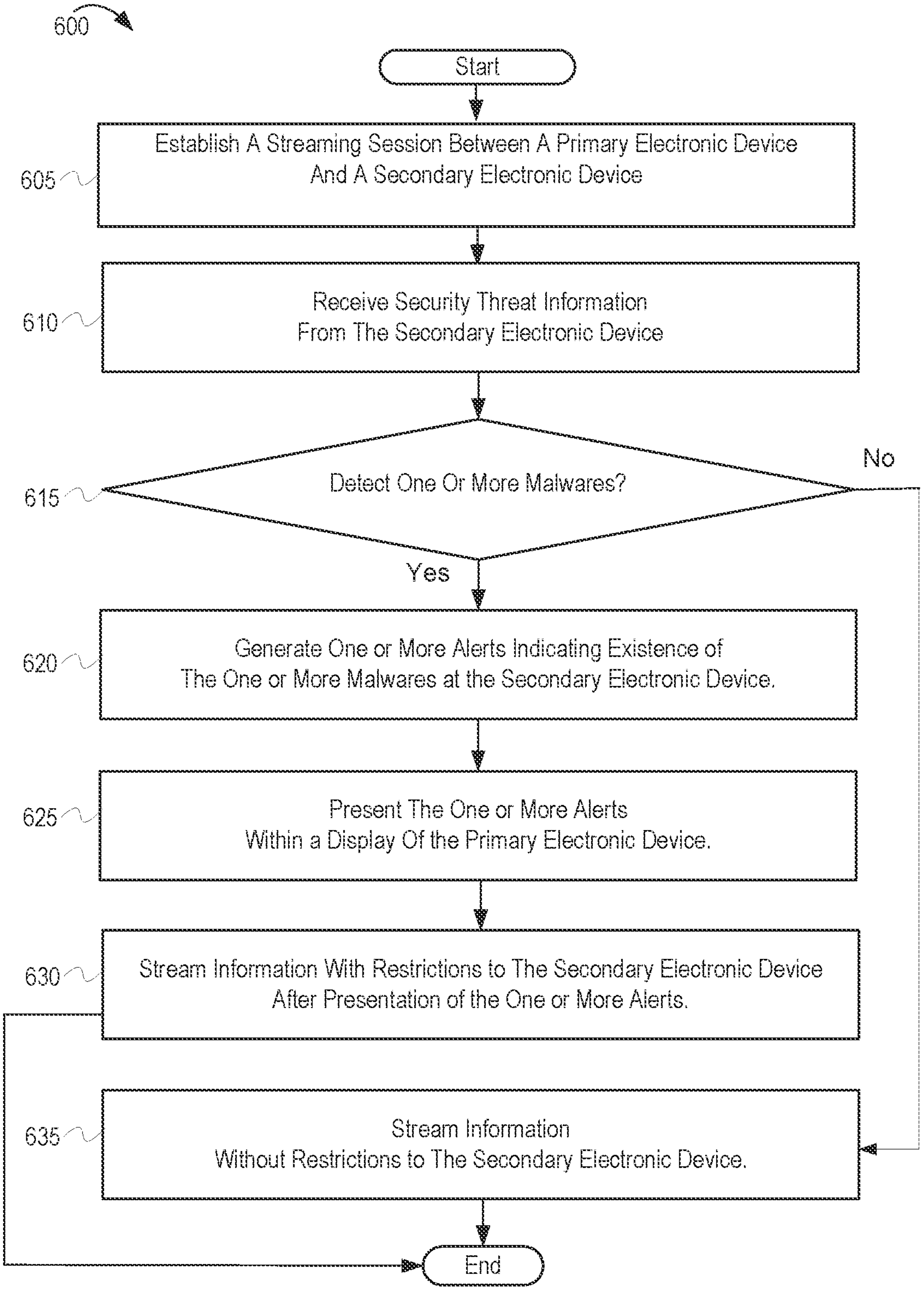
FIG. 6 depicts an example process for establishing a streaming session with a secondary electronic device and determining whether to restrict the information streamed to the secondary electronic device based on the security threat information provided by the secondary electronic device, according to one or more embodiments.
Figure 7:
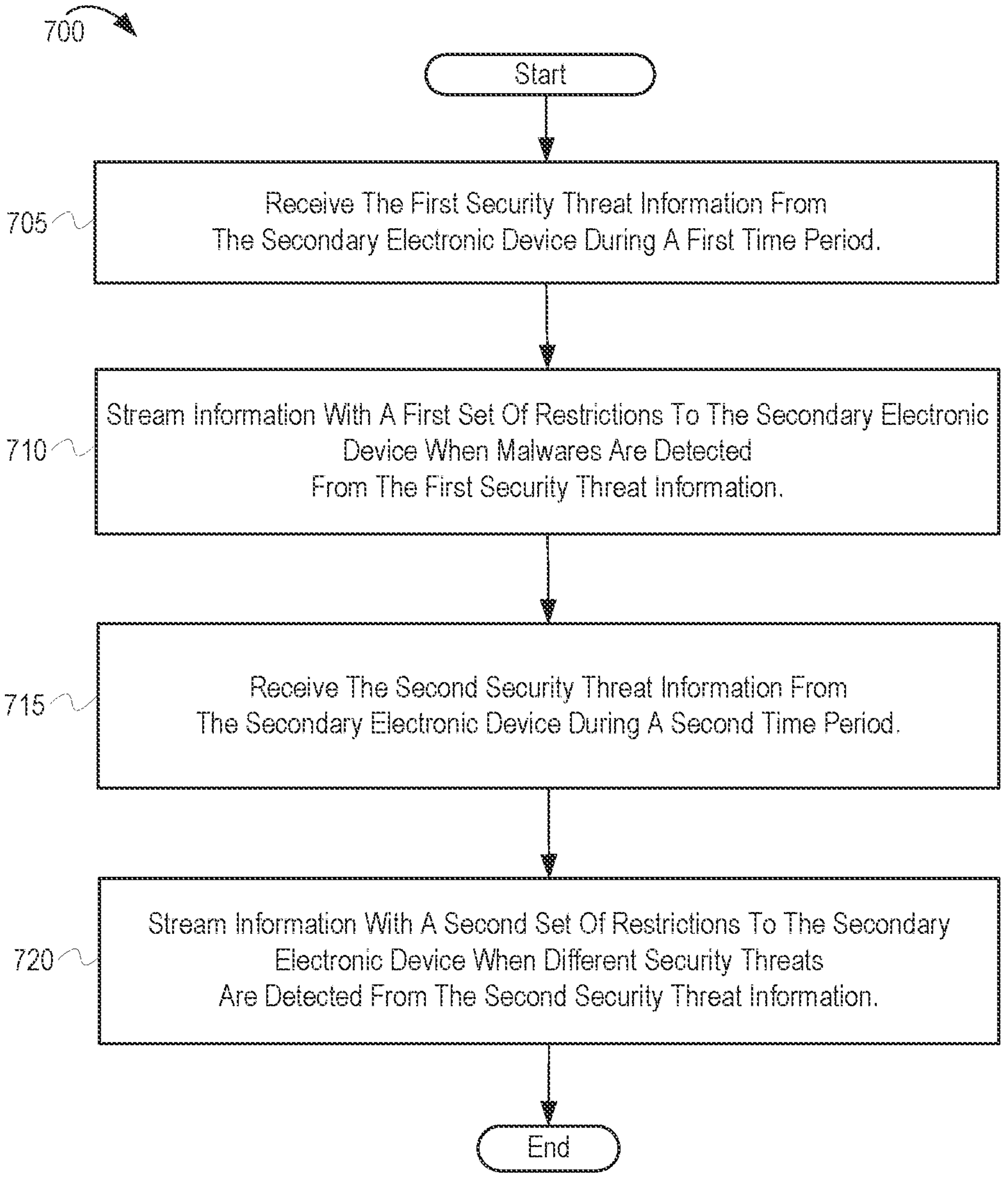
FIG. 7 depicts an example process of receiving and analyzing updated security threat information received from the secondary electronic device during a streaming session, according to one or more embodiments.
Figure 8:
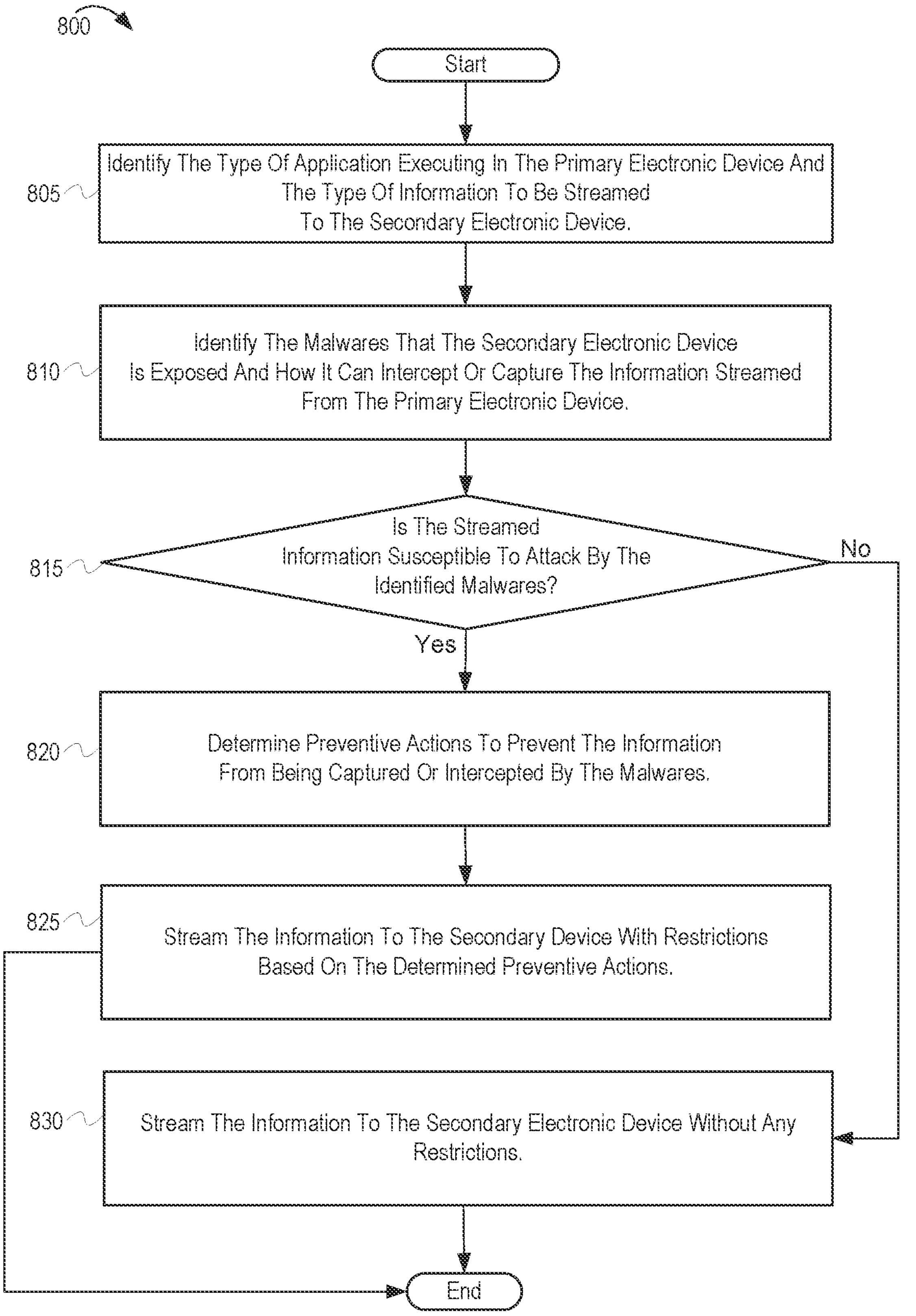
FIG. 8 depicts a process of determining restrictions to be applied to the information streamed to the secondary electronic device using information about the type of application and information about the malware identified in the security threat information, according to one or more embodiments.

FIGS. 6-8 depict flow diagrams of different methods for determining whether and how to restrict information streamed from a primary electronic device 205 to a secondary electronic device 210 based on security threat information 129B provided by the secondary electronic device 210, according to respective embodiments. The methods are implemented in order to prevent any confidential/private/sensitive information included in the streamed information from being intercepted or captured by hackers. In at least one embodiment, the primary electronic device 205 (or the electronic device 100) is controlled by processor 102, which executes code of the streaming module 126 (FIG. 1A) and the threat detection module 145 (including its AI code) to cause or configure the primary electronic device 205 to perform the functionality described for method 600 (FIG. 6), as well as method 700 (FIG. 7) and method 800 (FIG. 8). The primary device is configured to identify the type of application that generates the information to be streamed to the secondary electronic device, identify any potential malwares executing in the secondary electronic device, and determine appropriate preventive actions to restrict the information streamed to the secondary electronic device to protect at least some parts of the information from potential hackers. The description of methods 600/700/800 is provided with general reference to the specific components illustrated within the preceding FIGS. 1-5, and specific components referenced in methods 600/700/800 may be identical or similar to components of the same name used in describing preceding FIGS. 1-5.

FIG. 6 depicts an example process for establishing a streaming session with a secondary electronic device and determining whether to restrict the information streamed to the secondary electronic device 210 based on security threat information 129B provided by the secondary electronic device 210, according to one or more embodiments. The method 600 can be performed using the primary electronic device 205 of FIG. 2 (which can be implemented as, or can be similarly configured to, electronic device 100 of FIG. 1) executing an application that streams information from the primary electronic device 205 via the streaming module 126. The method 600 starts at block 605 where a streaming session is established between the primary electronic device 205 and the secondary electronic device 210. The streaming session can be established over a communication connection initiated by processor execution of the communication module 123 of the primary electronic device 205.

At block 610, the primary electronic device 205 receives the security threat information 129B from the secondary electronic device 210. The received security threat information 129B can be stored as security threat information 129A by the primary electronic device 205. As described above, the security threat information 129B can be received based on a request by the primary electronic device 205 or the security threat information 129B can be transmitted unilaterally by the secondary electronic device 210. The security threat information 129A can include information indicating that the secondary electronic device 210 is infected with zero or more malwares and, when applicable, specific information about the malwares.

At block 615, the security threat information 129A can be analyzed by the threat detection module 145 of the streaming module 126 to determine whether the security threat information 129A includes any information about malwares. When the security threat information 129A includes information that indicates the secondary electronic device 210 is not infected by any malwares, the method 600 can continue to block 635 where the information is streamed to the secondary electronic device 210 with minimal or no restrictions. When the security threat information 129A includes information that indicates the secondary electronic device 210 is infected with malwares, the method 600 can continue to block 620.

At block 620, one or more alerts can be generated to indicate that the secondary electronic device 210 is infected. The one or more alerts can be presented on the display 130 (FIG. 1). The one or more alerts can be used to notify a user of the primary electronic device 205 that the information streamed to the secondary electronic device 210 can be (or is being) restricted because of a potential risk. The alerts can further include information about the type of risk and the type of restriction recommended (for user selection and/or activation) or being autonomously applied. At block 630, after the alerts are presented, the information is streamed to the secondary electronic device 210 with the applied restrictions. Some examples of the restrictions are described with FIG. 5. In one or more embodiments, the generation and presentation of the one or more alerts are performed by operations of the AI code of the threat detection module 145.

FIG. 7 depicts an example process of receiving and analyzing updated security threat information from the secondary electronic device during a streaming session, according to one or more embodiments. The method 700 can be performed using the operations of the AI code of the threat detection module 145 of the electronic device 100. The method 700 can start after the streaming module 126 of the electronic device 100 has already started streaming information to the secondary electronic device 210. In one embodiment, the initial streaming session occurs without restrictions, as no security threat is detected at the time the streaming session commences. Alternatively, the method 700 can start with the streaming module 126 of the electronic device 100 having not yet streamed any information to the secondary electronic device 210.

The method 700 starts at block 705 where first security threat information is received from the secondary electronic device 210 during a first time period. The first security threat information can be received based on a request by the threat detection module 145 of the primary electronic device 205 or unilaterally provided by the second electronic device 210 triggered by, for example, an execution of an anti-malware application in the second electronic device 210 during an established streaming session. At block 710, the received first security threat information 129A is then analyzed and appropriate restrictions can be applied to restrict the information that is to be, or is being, streamed to the secondary device 210.

At block 715, while the information is being streamed, second security threat information can be received from the secondary electronic device 210. The second security threat information can be received based on another request by the threat detection module 145 or based on a certain trigger occurring in the second electronic device 210. For example, the update of the security threat information can occur periodically at the second electronic device 210, and such updates can trigger the sharing of the updated security threat information. At block 720, the second security threat information is then analyzed to update the restrictions applied to the information being streamed to the secondary device 210.

It is noted that the restrictions associated with the first security threat information and the restrictions associated with the second security threat information can be different when the malwares identified in the first security threat information are different from the malwares identified in the second security threat information. In one or more embodiments, the receiving of the first security threat information and the receiving of the second security threat information of the method 700 occur during the same streaming session.

FIG. 8 depicts an example process of determining restrictions to be applied to the information streamed to the secondary electronic device based on information about the type of application 505 and information about the malware identified in the security threat information 129A, according to one or more embodiments. The method 800 can be performed using the operations of the AI code of the threat detection module 145 of the electronic device 100. The method 800 can use the example table 500 shown in FIG. 5, where different types of applications and information and different types of malwares are described.

The method 800 can start at block 805, where the threat detection module 145 and/or its AI code can cause the device to analyze the application that generates the streamed information to determine its application type (e.g., document application, video application, financial institution application, etc.). The threat detection module 145 and/or its AI code can also analyze the streamed information to determine whether the streamed information can include confidential/private/sensitive information. At block 810, the threat detection module 145 and/or its AI code can analyze the malwares identified from the security threat information 129A to determine the type of malwares and how the malwares can be used to intercept or capture confidential/private/sensitive information that may be included in the streamed information.

At block 815, operations are performed to determine whether the streamed information is susceptible to the identified malwares. For example, referring to row 501 of FIG. 5, the banking application 506 can generate confidential financial information 516, and when the identified malware is an input/keyboard malware 526A, then the confidential financial information 515 is susceptible to the input/keyboard malware 526A when a user types in his/her financial information. From block 815, when the threat detection module 145 determines that the information generated by the application is not susceptible to any identified malware (e.g., the information is general in nature), the method 800 continues to block 830 where the information is streamed to the secondary electronic device 210 with minimal or no restrictions.

From block 815, when the threat detection module 145 determines that the information generated by the application (e.g., the financial/confidential information 516) is susceptible to one or more identified malwares, the method 800 continues to block 820 where preventive actions/measures are determined in order to prevent the information from being captured or intercepted by the malwares. For example, the preventive actions can include discontinuing the stream or selectively masking certain fields 536 of the presented information from being visible. At block 825, the determined preventive actions are used to apply restrictions to the information before the information is streamed to the secondary electronic device 210.

According to one or more embodiments, one or more of methods 600/700/800 further include the processor executing code to provide at least one indication of at least one preventive action required to be taken from a group including: (i) read-only capability of the information; (ii) selective masking of portions of the information; (iii) read-without-screenshot capability of the information; (iv) read-without-screen-recording capability of the information; and (v) discontinuation of streaming of the information.

One or more of the methods 600/700/800 further includes the processor executing code to present, within the display of the primary electronic device, one or more selectable restrictions from a group of selectable restrictions to enable a user of the primary electronic device to apply the one or more restrictions to control access to the information at the second electronic device.

One or more of the methods 600/700/800 further includes the processor executing code to generate a second notification indicating that access to the information is being restricted at the secondary electronic device according to the one or more restrictions applied by the user of the primary electronic device to control the access to the information, and transmit the second notification to the secondary electronic device to alert a user of the secondary electronic device that access to the information is being restricted. It is appreciated the notification can also be presented on the primary electronic device, in one or more embodiments.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:

a communication interface that connects the electronic device to a second electronic device to enable streaming of information from the electronic device to the second electronic device;

a memory comprising a security-enabled streaming module to stream the information using a connection established between the electronic device and the second electronic device, the security-enabled streaming module comprising an associated security threat detection module for enabling identification of potential threats existing on the second electronic device;

a processor communicatively coupled to the communication interface, and the memory, and which executes program code for the security-enabled streaming module, the processor configure to:

establish a streaming session over the connection established with the second electronic device via the communication interface;

receive first security threat information from the second electronic device during the streaming session, wherein the first security threat information comprises information identifying a malware detected on the second electronic device by a second security threat detection module executing on the second electronic device;

analyze the first security threat information to determine whether the second electronic device is vulnerable to any security threats; and in response to the first security threat information indicating that the second electronic device is vulnerable to at least one security threat:

generate and output an alert indicating a vulnerability of the second electronic device to the at least one security threat; and apply one or more types of restriction to the streaming session to restrict access at the second electronic device to the information being streamed from the electronic device to the second electronic device, the one or more types of restriction applied being based on the information identifying the malware and based on determining that a type of the malware identified is relevant to a type of the information being streamed to the second electronic device.

2. The electronic device of claim 1, wherein in applying the one or more types of restriction to the streaming session, the processor restricts access to the information at the second electronic device based on determining that the second electronic device is vulnerable to a first type of security threat.

3. The electronic device of claim 2, wherein each of the one or more type of restriction includes at least one type of restriction from a group of restrictions comprising:

read-only capability of the information;

selective masking of portions of the information;

read-without-screenshot capability of the information;

read-without-screen-recording capability of the information; and discontinuation of streaming of the information.

4. The electronic device of claim 1, wherein the processor is further configured to:

receive second security threat information from the second electronic device subsequent to receiving the first security threat information;

analyze the second security threat information to determine whether the second electronic device presents a different vulnerability to security threats from the at least one security threat determined from the first security threat information;

update one or more of a level or a type of restriction imposed on the streaming session based on determining that the second electronic device has a different vulnerability to security threats than the at least one security threat determined from the first security threat information; and apply the updated level or type of restriction to the streaming session to restrict access to the information at the second electronic device.

5. The electronic device of claim 1, wherein the processor is further configured to:

determine a relevance of the at least one security threat to a type of the information being streamed to the second electronic device;

generate the alert based on determining that the second electronic device is vulnerable to the at least one security threat that is relevant to the type of the information being streamed to the second electronic device; and present the alert within a display of the electronic device to indicate to a user of the electronic device that the second electronic device is vulnerable to the at least one security threat.

6. The electronic device of claim 5, wherein the processor is further configured to identify, using an artificial intelligence (AI) engine, at least one restriction from a group of restrictions to control access to the information at the second electronic device.

7. The electronic device of claim 1, wherein the processor is further configured to:

present, within a display of the electronic device, one or more selectable restrictions from a group of selectable restrictions to enable a user of the electronic device to apply the one or more selectable restrictions to control access to the information at the second electronic device.

8. The electronic device of claim 7, wherein the processor is further configured to:

generate a notification indicating that access to the information is being restricted at the second electronic device according to the one or more selectable restrictions applied by the user of the electronic device to control the access to the information; and transmit the notification to the second electronic device to alert a user of the second electronic device that access to the information is being restricted.

9. The electronic device of claim 1, wherein in applying the one or more types of restriction to the streaming session, the processor is configured to selectively apply a type of restriction from among a plurality of types of restriction based on the malware identified, wherein the processor:

applies a first type of restriction in response to the malware being a first malware type; and applies a second, different type of restriction in response to the malware being a second malware type.

10. A method comprising:

establishing, from a first electronic device, a streaming session over a connection established with a second electronic device via a communication interface, the streaming session streaming information from the first electronic device to the second electronic device;

receiving first security threat information from the second electronic device during the streaming session, wherein the first security threat information comprises information identifying a malware detected on the second electronic device by a security threat detection module executing on the second electronic device;

analyzing the first security threat information to determine whether the second electronic device is vulnerable to any security threats; and in response to the first security threat information indicating that the second electronic device is vulnerable to at least one security threat:

generating and outputting an alert indicating a vulnerability of the second electronic device to the at least one security threat; and applying one or more types of restriction to the streaming session to restrict access at the second electronic device to the information being streamed from the first electronic device to the second electronic device, the one or more types of restriction applied being based on the information identifying the malware and based on determining that a type of the malware identified is relevant to a type of the information being streamed to the second electronic device.

11. The method of claim 10, wherein applying the one or more types of restriction to the streaming session comprises restricting access to the information at the second electronic device based on determining that the second electronic device is vulnerable to a first type of security threat.

12. The method of claim 11, wherein each of the one or more type of restrictions includes at least one type of restriction from a group of restrictions comprising:

read-only capability of the information;

selective masking of portions of the information;

read-without-screenshot capability of the information;

read-without-screen-recording capability of the information; and discontinuation of streaming of the information.

13. The method of claim 10, further comprising:

receiving second security threat information from the second electronic device subsequent to receiving the first security threat information;

analyzing the second security threat information to determine whether the second electronic device presents a different vulnerability to security threats from the at least one security threat determined from the first security threat information;

updating one or more of a level or a type of restriction imposed on the streaming session based on determining that the second electronic device has a different vulnerability to security threats than the at least one security threat determined from the first security threat information; and applying the updated level or type of restriction to the streaming session to restrict access to the information at the second electronic device.

14. The method of claim 10, further comprising:

determining a relevance of at least the one security threat to a type of the information being streamed to the second electronic device;

generating the alert based on determining that the second electronic device is vulnerable to the at least one security threat that is relevant to the type of the information being streamed to the second electronic device; and presenting the alert within a display of the first electronic device to indicate to a user of the first electronic device that the second electronic device is vulnerable to the at least one security threat.

15. The method of claim 14, further comprising:

identifying, using an artificial intelligence (AI) engine, at least one restriction from a group of restrictions to control access to the information at the second electronic device.

16. The method of claim 10, further comprising:

presenting, within a display of the first electronic device, one or more selectable restrictions from a group of selectable restrictions to enable a user of the first electronic device to apply the one or more selectable restrictions to control access to the information at the second electronic device.

17. The method of claim 16, further comprising:

generating a notification indicating that access to the information is being restricted at the second electronic device according to the one or more selectable restrictions applied by the user of the first electronic device to control the access to the information; and transmitting the notification to the second electronic device to alert a user of the second electronic device that access to the information is being restricted.

18. The method of claim 10, wherein applying the one or more types of restriction to the streaming session comprises selectively applying a type of restriction from among a plurality of types of restriction based on the malware identified, by:

applying a first type of restriction in response to the malware being a first malware type; and applying a second, different type of restriction in response to the malware being a second malware type.

19. A computer program product comprising:

a computer readable storage device; and program code on the computer readable storage device that when executed by a processor associated with an electronic device, the program code enables the electronic device to provide functionality of:

establishing a streaming session over a connection established with a second electronic device via a communication interface, the streaming session streaming information from the electronic device to the second electronic device;

receiving first security threat information from the second electronic device during the streaming session, wherein the first security threat information comprises information identifying a malware detected on the second electronic device by a security threat detection module executing on the second electronic device;

analyzing the first security threat information to determine whether the second electronic device is vulnerable to any security threats; and in response to the first security threat information indicating that the second electronic device is vulnerable to at least one security threat:

generating and outputting an alert indicating a vulnerability of the second electronic device to the at least one security threat; and applying one or more types of restriction to the streaming session to restrict access at the second electronic device to the information being streamed from the electronic device to the second electronic device, the one or more types of restriction applied being based on the information identifying the malware and based on determining that a type of the malware identified is relevant to a type of the information being streamed to the second electronic device.

20. The computer program product of claim 19, wherein the program code further enables the electronic device to provide functionality of:

receiving second security threat information from the second electronic device subsequent to receiving the first security threat information;

analyzing the second security threat information to determine whether the second electronic device presents a different vulnerability to security threats from the at least one security threat determined from the first security threat information;

updating one or more of a level or a type of restriction imposed on the streaming session based on determining that the second electronic device has a different vulnerability to security threats than the at least one security threat determined from the first security threat information; and applying the updated level or type of restriction to the streaming session to restrict access to the information at the second electronic device.

* * * * *